US006765639B2

(12) United States Patent
Maeda

(10) Patent No.: US 6,765,639 B2
(45) Date of Patent: Jul. 20, 2004

(54) CIRCUIT FOR LIQUID CRYSTAL DISPLAY DEVICE AND ELECTRONIC EQUIPMENT, CONTROLLING ROTATIONAL DIRECTION OF LIGHT REFLECTED IN BOUNDARY DOMAIN

(75) Inventor: Tsuyoshi Maeda, Yamanashi (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/339,577

(22) Filed: Jan. 10, 2003

(65) Prior Publication Data

US 2003/0156241 A1 Aug. 21, 2003

(30) Foreign Application Priority Data

Jan. 10, 2002 (JP) ........................................ 2002-003607

(51) Int. Cl.[7] ............................................. G02F 1/1335
(52) U.S. Cl. ........................ 349/115; 349/111; 349/113; 349/114
(58) Field of Search .............................. 349/111, 113, 349/114, 115

(56) References Cited

U.S. PATENT DOCUMENTS 6,147,937 A * 11/2000 Arikawa et al. ............ 368/242
6,285,422 B1 * 9/2001 Maeda et al. ................. 349/96
6,300,929 B1 * 10/2001 Hisatake et al. .............. 345/94
6,512,560 B2 * 1/2003 Ohtake et al. .............. 349/114

FOREIGN PATENT DOCUMENTS

| JP | A-2000-122059 | 4/2000 |
| JP | A-2000-171789 | 6/2000 |
| JP | A-2000-193962 | 7/2000 |

* cited by examiner

Primary Examiner—Toan Ton
Assistant Examiner—Andrew Schechter
(74) Attorney, Agent, or Firm—Oliff & Berridge, PLC

(57) ABSTRACT

The invention provides a liquid crystal display device that can reliably prevent light leakage in between dot display domains at boundaries to prevent decrease in contrast and to suppress color mixing. The invention can include semitransmissive reflective layer having a cholesteric liquid crystal layer is arranged in dot display domains, and a metal reflective layer is arranged in a BM domain separating the dot display domains. The metal reflective layer can alter the rotational direction of reflected circularly polarized light from that before reflection and the device can create high-contrast liquid crystal display.

9 Claims, 7 Drawing Sheets

CIRCUIT FOR LIQUID CRYSTAL DISPLAY DEVICE AND ELECTRONIC EQUIPMENT, CONTROLLING ROTATIONAL DIRECTION OF LIGHT REFLECTED IN BOUNDARY DOMAIN

BACKGROUND OF THE INVENTION

1. Field of Invention

The present invention relates to a liquid crystal display device and electronic equipment. More specifically, the present invention relates to a reflective or semitransmissive reflective liquid crystal display device having a reflective layer or a semitransmissive reflective layer and to electronic equipment using the liquid crystal display device.

2. Description of Related Art

Recently, reflective or semitransmissive reflective liquid crystal display devices have been proposed. These devices have a reflective layer which uses, for example, a metal thin film or a semitransmissive reflective layer which uses a material, such as a cholesteric liquid crystal. For example, Al and Ag having a high reflectivity are used as the metal thin film. In such a device, incident extraneous light, such as sunlight and luminous light, is reflected through a liquid crystal layer, and the liquid crystal layer is driven so as to create a reflective display.

The cholesteric liquid crystal can include liquid crystal molecules structurally arrayed as a periodic helix with a constant pitch, selectively reflects light with a wavelength corresponding to the pitch of the helix and transmits the other light. Such a device using a reflector plate having the cholesteric liquid crystal selectively reflects light with a specific wavelength and transmits the other light to create a semitransmissive reflective display.

These types of reflective or semitransmissive reflective liquid crystal display devices can each include a plurality of dot display domains separated by black matrices, and either one of the dot display domains is capable of displaying one of the light's three primary colors. A trio of red, green and blue dots display domains forms a pixel. Each black matrix separating the dot display domains serves to create a black display in the formation zone and uses, for example, a resin shielding film containing a pigment.

When such a resin shielding film is used as the black matrix, the resin shielding film might transmit trace light, although it absorbs light. If the shielding film transmits the light, it may cause light leakage to thereby reduce contrast.

SUMMARY OF THE INVENTION

The present invention has been accomplished to solve the above problems, and an object of the present invention is to provide a liquid crystal display device that can reliably avoid color mixing between dot display domains at the boundary therebetween and can prevent or suppress decrease in contrast. Another object of the present invention is to provide electronic equipment using the liquid crystal display device.

To achieve the above objects, the present invention can provide a liquid crystal display device having a liquid crystal cell, the liquid crystal cell including a pair of substrates facing each other and a liquid crystal layer disposed between the pair of substrates. The liquid crystal display device can include a plurality of dot display domains separated by a boundary domain and disposed in a plane, a specific circularly polarized light introducing device that is capable of introducing circularly polarized light having a predetermined rotational direction between the pair of substrates, and a reflecting device that is capable of at least reflecting circularly polarized light, the reflecting device including a rotational direction controlling device that is capable of controlling the rotational direction of the circularly polarized light reflected in the dot display domains to differ from that reflected in the boundary domain.

In this device, when circularly polarized light having a predetermined rotational direction enters between the pair of substrates from the specific circularly polarized light introducing device and is reflected by the reflecting device, the circularly polarized light reflected in the dot display domains can have a rotational direction different from that reflected in the boundary domain. Accordingly, the circularly polarized light reflected in the dot display domains can exit from the specific circularly polarized light introducing device, and the circularly polarized light reflected in the boundary domain cannot exit from the specific circularly polarized light introducing device.

Specifically, the specific circularly polarized light introducing device can allow the circularly polarized light reflected in a dot display domain to exit to thereby create a bright display in the dot display domain and can allow the circularly polarized light reflected in the boundary domain not to exit to thereby create a dark display in the boundary domain. Accordingly, the device can use the domain capable of at least producing a bright display as a display domain (pixel domain) that contributes to display, and the domain capable of producing a dark display as a non-display domain that does not contribute to display, i.e., a black matrix. The rotational direction of the incident circularly polarized light in a dot display domain can be changed based on the orientation mode of the liquid crystal layer. By this configuration, a bright or dark display can freely be created in the dot display domain.

This configuration can be easily formed and is resistant to transmittance in the black matrix to prevent or suppress decrease in contrast due to light leakage. The contrast decreases due to transmittance in the black matrix in the following manner. In reflective display, for example, light transmitting the black matrix is reflected and contributes to a bright display. In semitransmissive reflective display, for example, light passing through the black matrix in transmissive display contributes to a bright display. Thus, the present invention can achieve a configuration that yields less decrease in contrast than a configuration using a resin shielding film as a black matrix in a liquid crystal display device which creates at least a reflective display. The term circularly polarized light as used herein also includes elliptically polarized light More specifically, the reflecting device may include a first reflective layer capable of reflecting at least a part of circularly polarized light having a predetermined rotational direction and capable of allowing the circularly polarized light after reflection to have the same rotational direction as that before reflection, and a second reflective layer capable of at least reflecting circularly polarized light and capable of allowing the circularly polarized light after reflection to have a different rotational direction from that before reflection, in which the first reflective layer and the second reflective layer are disposed in either of the dot display domains and the boundary domain, respectively.

In this device, the first reflective layer is capable of allowing the circularly polarized light after reflection to have the same rotational direction as that before reflection and the second reflective layer is capable of allowing the circularly polarized light after reflection to have a different rotational direction from that before reflection. Thus, a dark display as a black matrix can reliably be created in the boundary domain. When the first reflective layer structurally reflects a part of and transmits the other part of circularly polarized light having a predetermined rotational direction, the first reflective layer serves as a semitransmissive reflective layer. For example, by allowing the rotational direction of incident circularly polarized light in a domain where the first reflective layer is disposed to vary depending on the orientation mode of the liquid crystal layer, a reflective or transmissive display can be optionally created in the dot display domain. In this case, the second reflective layer plays a role as a black matrix in reflective display as above. In contrast, a transmissive display can be created by allowing the first reflective layer to transmit light from a light source (hereinafter referred to as internal light) that can enter in a direction different from that in the reflective display. The second reflective layer in this case reflects the internal light that can enter in a direction different from that in the reflective display and can play a role as a black matrix. Accordingly, the device according to the present invention can create a high-contrast display both in the reflective and the transmissive displays. In this connection, by controlling the rotational direction of the circularly polarized light coming into the first reflective layer based on the driving mode of the liquid crystal layer in a dot display domain, a bright or dark display can be created in the dot display domain.

The device may also have a configuration, in which the first reflective layer is arranged across the dot display domain and the boundary domain, the second reflective layer is arranged only in the boundary domain. Further, the first reflective layer can be arranged between the liquid crystal layer and one of the pair of substrates and at least serves as a reflecting means in the dot display domains, and the second reflective layer can be arranged closer to the other substrate of the pair of substrates than the first reflective layer and serves as a reflecting means in the boundary domain.

In the above device, for example, the second reflective layer can prevent the circularly polarized light from entering at the first reflective layer in the boundary domain and can prevent an desired display caused by the reflection in the first reflective layer in the boundary domain. Accordingly, the device can create a reflective display reflected by the first reflective layer alone in the dot display domain and a reflective display reflected by the second reflective layer alone in the boundary domain. Thus, the device can create high-contrast reflective display.

The first reflective layer can mainly include a cholesteric liquid crystal. The cholesteric liquid crystal selectively reflects light with a wavelength corresponding to the pitch of its helix and transmits the other light. In addition, circularly polarized light reflected by the cholesteric liquid crystal has a different rotational direction from that before reflection. Accordingly, such a cholesteric liquid crystal can be used as the first reflective layer in the present invention.

The second reflective layer can mainly include one or more metal films selected from Cr, Ta, Ag, and Al. Such metal films can highly shield the internal light, lead to no depolarization and enables the circularly polarized light after reflection to have a different rotational direction from that before reflection and are suitable as the second reflective layer in the present invention. In stead of metal films, for example, a dielectric mirror mainly including an inorganic oxide can be used as the second reflective layer.

The liquid crystal display device of the present invention may further include a first circularly polarized light introducing device that introduces circularly polarized light through one of the pair of substrates into the liquid crystal layer and serving as the specific circularly polarized light introducing device, and a second circularly polarized light introducing device that introduces circularly polarized light through the other of the pair of substrates and serving as the specific circularly polarized light introducing device. The circularly polarized light described above has the same rotational direction as the circularly polarized light from the one of the pair of substrates. Further, the invention can include a luminaire for introducing light through the other substrate into the liquid crystal cell, in which the liquid crystal layer reverses the polarity of incoming circularly polarized light in one of the case with the application of a selective electric field and the case without the application of a selective electric field and does not in the other case.

By this configuration, the luminaire arranged close to the other substrate enables a semitransmissive reflective display in a domain in which the first reflective layer is arranged, and the second reflective layer can also play a role as a black matrix in the semitransmissive reflective display to create a high-contrast display.

The specific circularly polarized light introducing device may have a polarizing plate capable of transmitting linearly polarized light in one direction, and a wave plate capable of converting the linearly polarized light passed through the polarizing plate into circularly polarized light. In this case, the polarizing plate can yield linearly polarized light, the linearly polarized light passes through the wave plate to yield circularly polarized light. By equalizing the polarizing axes in the polarizing plates and the phase differences of the wave plates in the pair of substrates, circularly polarized light having the same rotational direction can be obtained in the two substrates.

In addition, the present invention provides electronic equipment including the liquid crystal display device having the above configuration. This configuration can provide electronic equipment having a high-contrast display unit.

The term mainly includes an ingredient as used herein can be used to describe that the ingredient is contained at the highest content among constitutive ingredients in a unit in question.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

Figure 1:
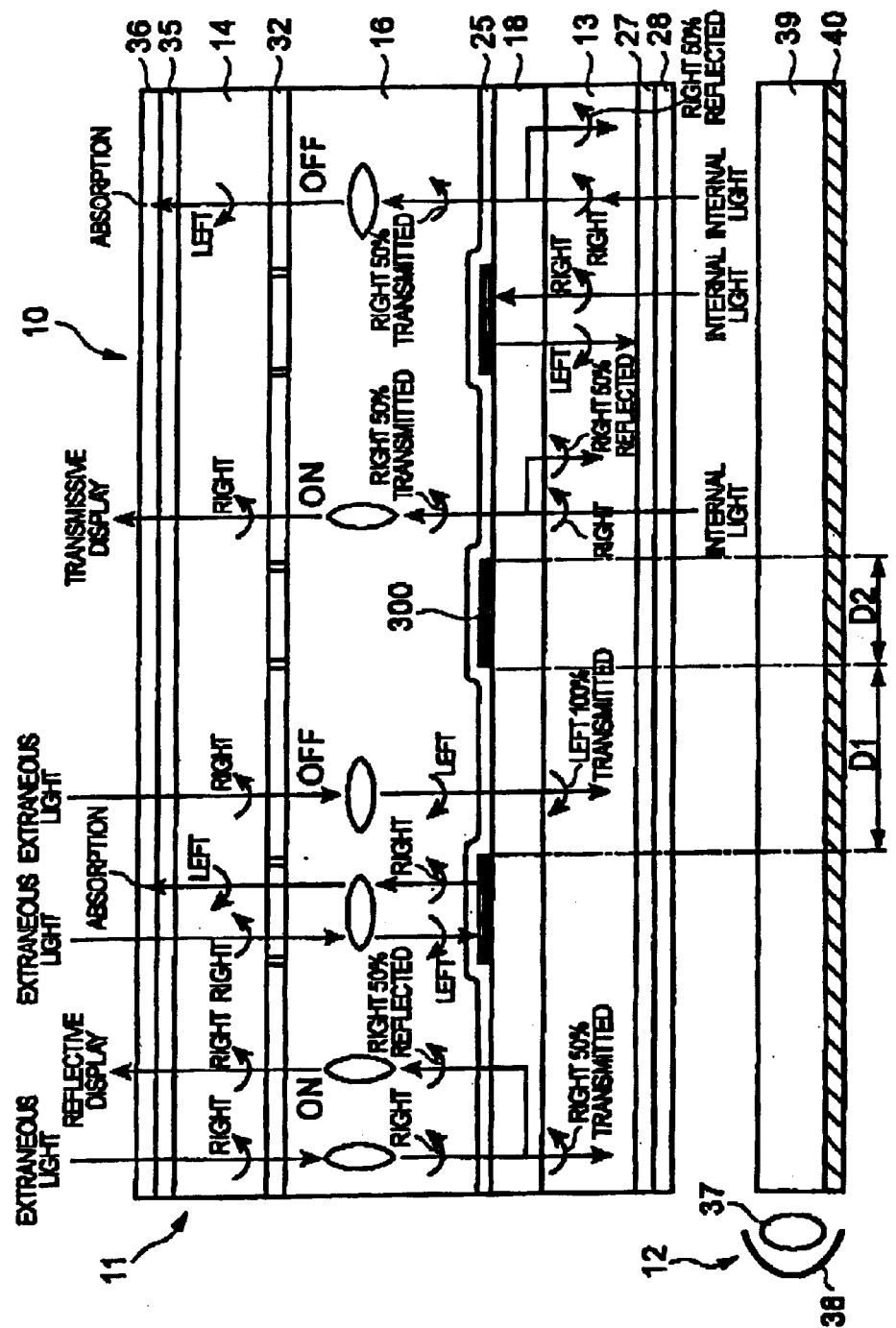
FIG. 1 is a schematic diagram of a partial sectional structure of a liquid crystal display device according to an embodiment of the present invention.

First Embodiment of the present invention will be illustrated below with reference to the drawings. FIG. 1 is a partial sectional view of an exemplary structure of a liquid crystal display device according to the present embodiment by taking an active-matrix semitransmissive reflective liquid crystal display device as an example. In all the drawings, ratios of thickness and/or size of individual constitutive elements are suitably modified for easy view of the drawings.

With reference to FIG. 1, a liquid crystal display device 10 according to the present embodiment can have a liquid crystal cell 11 and a backlight 12 (luminaire). The liquid crystal cell 11 can includes a lower substrate 13 and an upper substrate 14 facing each other with the interposition of a sealant (not shown) and a liquid crystal layer 16 (liquid crystal layer for phase modulation) including comprising a super twisted nematic (STN) liquid crystal encapsulated in a space surrounded by the upper substrate 14, the lower substrate 13 and the sealant. The backlight 12 is disposed on a rear side of the liquid crystal cell 11 (below the lower substrate 13).

In the liquid crystal display device 10 of FIG. 1, the upper substrate 14 serves as an element substrate having a switching element as a driving means for active matrix driving, and the lower substrate 13 serves as a counter substrate facing the element substrate. The side on which the upper substrate 14 is disposed is a front side and is an upper side in the present embodiment. Likewise, the side on which the lower substrate 13 is disposed is a rear side and is a lower side in the present embodiment.

The lower substrate 13 and the upper substrate 14 mainly includes a translucent material, such as glass and plastics. The device further includes a wave plate (quarter-wave plate) 27 and a lower polarizing plate 28 in this order on an outer side of the lower substrate 13 (a side opposite to the liquid crystal layer 16). The device also includes a wave plate (quarter-wave plate) 35 and an upper polarizing plate 36 in this order on an outer side of the upper substrate 14 (an opposite side to the liquid crystal layer 16).

The device has a semitransmissive reflective layer 18 having a cholesteric liquid crystal layer on an inner side of the lower substrate 13 (a side where the liquid crystal layer 16 is disposed) and includes a metal reflective layer 300 in a predetermined pattern such as a mesh pattern on an upper side of the semitransmissive reflective layer 18. A common electrode 25 composed of transparent conductive film, such as ITO, is formed over the entire metal reflective layer 300 and the semitransmissive reflective layer 18 between the patterned metal reflective layer 300.

A pixel electrode 32 including a transparent conductive film, such as ITO, is disposed in a predetermined matrix pattern on an inner side of the upper substrate 14 (on a side where the liquid crystal layer 16 is disposed). The metal reflective layer 300 mainly can include Al and is capable of reflecting circularly polarized light, in which the rotational direction of the reflected circularly polarized light is different from that before reflection. The metal reflective layer 300 can also mainly includes at least one selected from Al, Cr, Ta, and Ag.

The backlight 12 can include a light source 37, a reflector plate 38, and a light guide plate 39. A reflector plate 40 is arranged on a lower side of the light guide plate 39 (on an opposite side to the liquid crystal cell 11) for allowing light transmitting through the light guide plate 39 to emerge to the liquid crystal cell 11.

The upper polarizing plate 36 transmits only linearly polarized light in one direction (the lateral direction in the figure in the present embodiment), and the wave plate 35 converts the linearly polarized light transmitted through the upper polarizing plate 36 into circularly polarized light. Accordingly, the upper polarizing plate 36 and the wave plate 35 serve as a specific circularly polarized light introducing device that introduces circularly polarized light only in a predetermined rotational direction into between the pair of substrates (i.e., into the liquid crystal cell 11). The lower polarizing plate 28 transmits linearly polarized light only in one direction (the lateral direction in the figure in the present embodiment), and the wave plate 27 converts the linearly polarized light transmitted through the lower polarizing plate 28 into circularly polarized light. Accordingly, the lower polarizing plate 28 and the wave plate 27 also serve as a specific circularly polarized light introducing device.

The liquid crystal layer 16 is oriented in a longitudinal direction (in a vertical direction) in the paper plane when a voltage is applied between the common electrode 25 and the pixel electrode 32 (with the application of a selective electric field "ON") and is oriented in a lateral direction (in a horizontal direction) in the paper plane without the application of a voltage (without the application of a selective electric field "OFF"). The terms without the application of a selective electric field and with the application of a selective electric field can mean in the case where an applied voltage to the liquid crystal layer is lower than a threshold voltage of the liquid crystal and in the case where an applied voltage to the liquid crystal layer is equal to or higher than a threshold voltage of the liquid crystal, respectively. The liquid crystal layer 16 can modulate the phase of incident light depending on whether or not a selective electric field is applied thereto. Specifically, in the device according to the present embodiment, the liquid crystal layer with the application of a selective electric field does not modulate the phase of incoming circularly polarized light and transmits the same as circularly polarized light having the same rotational direction as that before entrance. Without the application of a selective electric field, the liquid crystal layer modulates the phase of incoming circularly polarized light to convert the same into circularly polarized light having a rotational direction to reverse of that before entrance and transmits the circularly polarized light.

In the liquid crystal display device 10 according to the present embodiment, domains where the pixel electrode 32 is arranged in a matrix form, i.e., domains separated by the network metal reflective layer 300, are dot display domains D1, and a domain in between the pixel electrode 32, i.e. a domain where the metal reflective layer 300 is arranged, is a black matrix domain (BM domain) D2 serving as a boundary domain.

The semitransmissive reflective layer 18 mainly including a cholesteric liquid crystal transmits a part of circularly polarized light having a specific rotational direction in a predetermined amount and reflects the other. In the device according to the present embodiment, the semitransmissive reflective layer 18 transmits about 50% of, and reflects about 50% of counterclockwise circularly polarized light (the ratio of transmission to reflection is about 1:1). It transmit 100% of clockwise circularly polarized light. This function is based on that the cholesteric liquid crystal reflects light with a wavelength corresponding to each helical pitch and transmits light with the other wavelengths.

Figure 6:
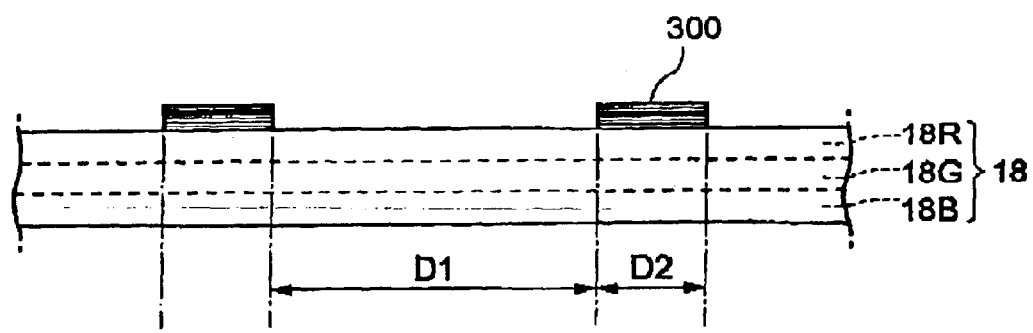
FIG. 6 is a schematic diagram of a configuration of a semitransmissive reflective layer having a cholesteric liquid crystal layer.

FIG. 6 is a schematic diagram illustrating the detailed configuration of the semitransmissive reflective layer 18 shown in FIG. 1. The semitransmissive reflective layer 18 of the liquid crystal display device 10 according to the present embodiment can include a number of laminated cholesteric liquid crystal layers having different helical pitches, i.e., a red-reflective cholesteric liquid crystal layer 18R, a green-reflective cholesteric liquid crystal layer 18G, and a blue-reflective cholesteric liquid crystal layer 18B. Each of these cholesteric liquid crystal layers 18R, 18G and 18B are formed as reflective plates and reflect light with a different wavelength corresponding to each helical pitch. More specifically, the red-reflective cholesteric liquid crystal layer 18R mainly includes a cholesteric liquid crystal having a helical pitch with a maximum reflection at about 600 nm, the green-reflective cholesteric liquid crystal layer 18G mainly includes a cholesteric liquid crystal having a helical pitch with a maximum reflection at about 550 nm, and the blue-reflective cholesteric liquid crystal layer 18B mainly comprises a cholesteric liquid crystal having a helical pitch with a maximum reflection at about 450 nm, and light with any of the aforementioned wavelengths is reflected by the corresponding layer.

Accordingly, light reflected by the semitransmissive reflective layer 18 can create a white display as a result of mixing the three primary colors R (red), G (green), and B (blue) in each dot display domain D1. The semitransmissive reflective layer 18 can include an assemblage of the cholesteric liquid crystal layers 18R, 18G, and 18B having different helical pitches can be formed by the following manner. For example, a cholesteric liquid crystal is homogeneously applied to a surface of a predetermined substrate and is irradiated with ultraviolet rays at a predetermined intensity. The cholesteric liquid crystal can further be applied thereto and is irradiated with ultraviolet rays at another intensity. Another layer of be the cholesteric liquid crystal is further applied thereto and is irradiated with ultraviolet rays at yet another intensity. The liquid crystal molecules in each layer can have a different helical pitch corresponding to the ultraviolet rays intensity to form the cholesteric liquid crystal layers 18R, 18G, and 18B having different helical pitches. The liquid crystal molecules in each layer can also be given a different helical pitch by varying, for example, the ultraviolet wavelength or heat in each layer rather than varying the ultraviolet intensity.

In the liquid crystal display device 10 according to the present embodiment, the extraneous light, such as sunlight and luminous light, entering from the top of the upper substrate 14 passes through the upper polarizing plate 36 and the wave plate 35 and is converted into counterclockwise circularly polarized light, and the counterclockwise circularly polarized light enters at the liquid crystal layer 16. When a voltage is applied between the common electrode 25 and the pixel electrode 32 in a dot display domain D1 (with the application of a selective electric field), the liquid crystal layer 16 becomes active, ON, and transmits the counterclockwise circularly polarized light as intact.

When no voltage is applied between the common electrode 25 and the pixel electrode 32 (without the application of a selective electric field), the liquid crystal layer 16 become inactive, OFF, converts the counterclockwise circularly polarized light into clockwise circularly polarized light and transmits the same. In the BM domain D2, a voltage is never applied, and the liquid crystal layer 16 is always OFF, converts the counterclockwise circularly polarized light into clockwise circularly polarized light and transmits the same.

When a selective electric field is applied to the liquid crystal layer 16 in the dot display domain D1, the extraneous light coming through the upper polarizing plate 36 and the wave plate 35 remains as intact as counterclockwise circularly polarized light even after passing through the liquid crystal layer 16 with the application of a selective electric field. The counterclockwise circularly polarized light after passing through the cholesteric liquid crystal 16 enters at the semitransmissive reflective layer 18. Of the incoming counterclockwise circularly polarized light, about 50% is transmitted and about 50% is reflected. The reflected about 50% counterclockwise circularly polarized light travels through the liquid crystal layer 16 with the application of a selective electric field, the upper substrate 14, the wave plate 35, and the upper polarizing plate 36 and creates a reflective display as counterclockwise circularly polarized light as is.

When no selective electric field is applied to the liquid crystal layer 16 in the dot display domain D1, the extraneous light entered through the upper polarizing plate 36 and the wave plate 35 is converted into clockwise circularly polarized light after passing through the liquid crystal layer 16. The clockwise circularly polarized light passed through the liquid crystal layer 16 enters at and passes through the semitransmissive reflective layer 18 toward the lower substrate 13, is absorbed by the lower polarizing plate 28 and does not create a display, since the semitransmissive reflective layer 18 does not reflect such clockwise circularly polarized light. Accordingly, a bright or dark display by reflective display can be created in the dot display domain D1 depending on whether or not a selective electric field is applied to the liquid crystal layer 16.

Extraneous light coming in the BM domain D2 is converted into counterclockwise circularly polarized light by the upper polarizing plate 36 and the wave plate 35, and the counterclockwise circularly polarized light alone comes into and passes through the liquid crystal layer 16, to which no voltage is applied, and is converted into clockwise circularly polarized light. The clockwise circularly polarized light converted in the liquid crystal layer 16 is reflected and is converted into counterclockwise circularly polarized light by the metal reflective layer 300. The reflected counterclockwise circularly polarized light then passes through the liquid crystal layer 16, to which no voltage is applied, and is converted into clockwise circularly polarized light. The clockwise circularly polarized light travels through the upper substrate 14 and the wave plate 35 and is absorbed by the upper polarizing plate 36. A dark display is always created in the BM domain D2 in reflective display, and the metal reflective layer 300 plays a role as a black matrix contributing to improved contrast in reflective display.

Light source (internal light source) coming into the liquid crystal cell 11 from the luminaire 12 is converted into counterclockwise circularly polarized light by the lower polarizing plate 28 and the wave plate 27 and enters at the semitransmissive reflective layer 18 from below. Of the counterclockwise circularly polarized light coming in the semitransmissive reflective layer 18, about 50% in quantity is reflected and about 50% in quantity is transmitted, and the transmitted about 50% counterclockwise circularly polarized light enters at the liquid crystal layer 16, as in the extraneous light.

When a selective electric field is applied to the liquid crystal layer 16 in the dot display domain D1, the internal light is converted into counterclockwise circularly polarized light by the lower polarizing plate 28 and the wave plate 27, passes through the semitransmissive reflective layer 18 as intact and further passes through the liquid crystal layer 16 with the application of a selective electric field, travels as counterclockwise circularly polarized light through the upper substrate 14, the wave plate 35 and the upper polarizing plate 36 and does not create a transmissive display.

When no selective electric field is applied to the liquid crystal layer 16 in the dot display domain D1, the internal light is converted into counterclockwise circularly polarized light by the lower polarizing plate 28 and the wave plate 27, passes through the semitransmissive reflective layer 18, passes again through the liquid crystal layer 16 (still with no selective electric field applied), travels through the upper substrate 14 and the wave plate 35 and is finally absorbed by the upper polarizing plate 36. Thus, the internal light in this case does not create a display. Accordingly, a bright or dark display by transmissive display can be created in the dot display domain D1 depending on whether or not a selective electric field is applied to the liquid crystal layer 16.

Internal light coming in the BM domain D2 from the luminaire 12 is converted into counterclockwise circularly polarized light alone by the lower polarizing plate 28 and the wave plate 27. About 50% of the counterclockwise circularly polarized light is allowed to pass through the semitransmissive reflective layer 18 and is reflected and converted into clockwise circularly polarized light by the metal reflective layer 300. The reflected clockwise circularly polarized light travels through the semitransmissive reflective layer 18, the lower substrate 13 and the wave plate 27 and is absorbed by the lower polarizing plate 28. The metal reflective layer 300 in the BM domain D2 serves as a shielding layer with respect to the incident light from the luminaire 12 and plays a role as a black matrix contributing to improved contrast in transmissive display.

The semitransmissive reflective layer 18 can be arranged across the dot display domain D1 and the BM domain D2 and formed between the lower substrate 13 and the liquid crystal layer 16. In contrast, the metal reflective layer 300 can be arranged only in the BM domain D2 on the upper substrate 14 side above the semitransmissive reflective layer 18, facing toward the upper substrate 14. The metal reflective layer 300 prevents the circularly polarized light from coming into the semitransmissive reflective layer 18 in the BM domain D2. A reflective display (bright display or dark display) due to the semitransmissive reflective layer 18 alone can be created in the dot display domain D1, and a reflective display (dark display) due to the metal reflective layer 300 alone can be created in the BM domain D2. Thus, high-contrast reflective display can be realized.

As thus described, in the liquid crystal display device 10 according to the present embodiment, the BM domain D2 separating the dot display domains D1 has the metal reflective layer 300, and the metal reflective layer 300 can alter the rotational direction of the reflected circularly polarized light depending on whether or not a selective electric field is applied to the liquid crystal layer 16 as in the semitransmissive reflective e layer 18 in the dot display domains D1. Accordingly, the BM domain D2 can serve as a black matrix and the dot display domains D1 can serve as a pixel domain contributing to display. Specifically, the rotational direction of the reflected circularly polarized light is the same as that before reflection in the semitransmissive reflective layer 18 including the cholesteric liquid crystal and is different from that before reflection in the metal reflective layer 300. Accordingly, the upper polarizing plate 36 can absorb the circularly polarized light reflected in the BM domain D2 (by the metal reflective layer 300) and can transmit the circularly polarized light reflected in the dot display domain D1 (by the semitransmissive reflective layer 18) depending on whether or not a selective electric field is applied to the liquid crystal layer 16.

In this device, a display with a desired concentration can be created in a dot display domain, in which the circularly polarized light can pass through the upper polarizing plate 36, by controlling the rotational direction of the circularly polarized light based on whether or not a selective electric field is applied to the liquid crystal layer 16. The BM domain D2 has the black matrix to create high contrast reflective display. In addition, the black matrix including the metal reflective layer 300 can reliably prevent light transmission to the semitransmissive reflective layer 18 to create higher-contrast reflective display.

Figure 7:
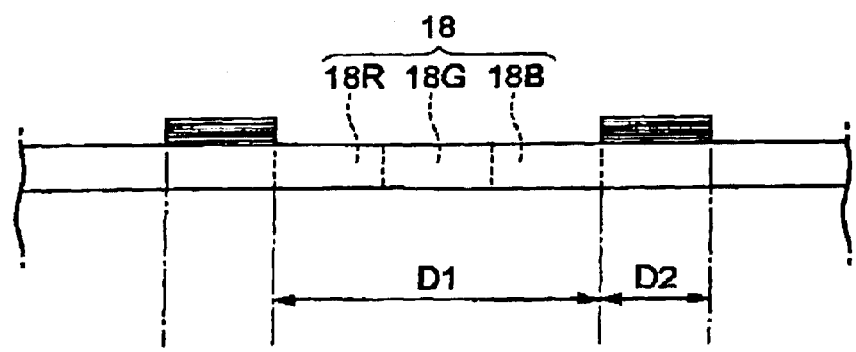
FIG. 7 is a schematic diagram showing a modification of FIG. 6.

The semitransmissive reflective layer 18 shown in the present embodiment can also have a configuration shown in FIG. 7. Specifically, plural cholesteric liquid crystal domains having different helical pitches are disposed in one plane in one dot display domain D1. These are a red-reflective cholesteric liquid crystal domain 18R, a green-reflective cholesteric liquid crystal domain 18G, and a blue-reflective cholesteric liquid crystal domain 18B. Each of these cholesteric liquid crystal domains 18R, 18G and 18B reflects light with a different wavelength corresponding to each helical pitch. More specifically, the red-reflective cholesteric liquid crystal domain 18R mainly includes a cholesteric liquid crystal having a helical pitch with a maximum reflection at about 600 nm, the green-reflective cholesteric liquid crystal domain 18G mainly includes a cholesteric liquid crystal having a helical pitch with a maximum reflection at about 550 nm, and the blue-reflective cholesteric liquid crystal domain 18B mainly includes a cholesteric liquid crystal having a helical pitch, with a maximum reflection at about 450 nm, and light with any of the aforementioned wavelength is reflected by the corresponding domain.

Accordingly, light reflected by the semitransmissive reflective layer 18 can create a white display as a result of mixing the three primary colors R (red), G (green), and B (blue). The semitransmissive reflective layer 18 can be formed by the following manner. For example, a cholesteric liquid crystal is homogeneously applied to a surface of a predetermined substrate and is irradiated with ultraviolet rays. In this procedure, the ultraviolet rays are shown with an intensity distribution control applied to a specific domain at a different specific intensity. The liquid crystal molecules in the individual domains can have different helical pitches corresponding to the intensity. The specific domains are the cholesteric liquid crystal domains 18R, 18G, and 18B. Instead of distributing the ultraviolet intensity, the liquid crystal molecules in each dot can also have a different helical pitch by distributing, for example, the ultraviolet wavelength or heat in each dot Other embodiments of liquid crystal display devices to which the configuration of the present invention can be applied will be described below.

Figure 2:
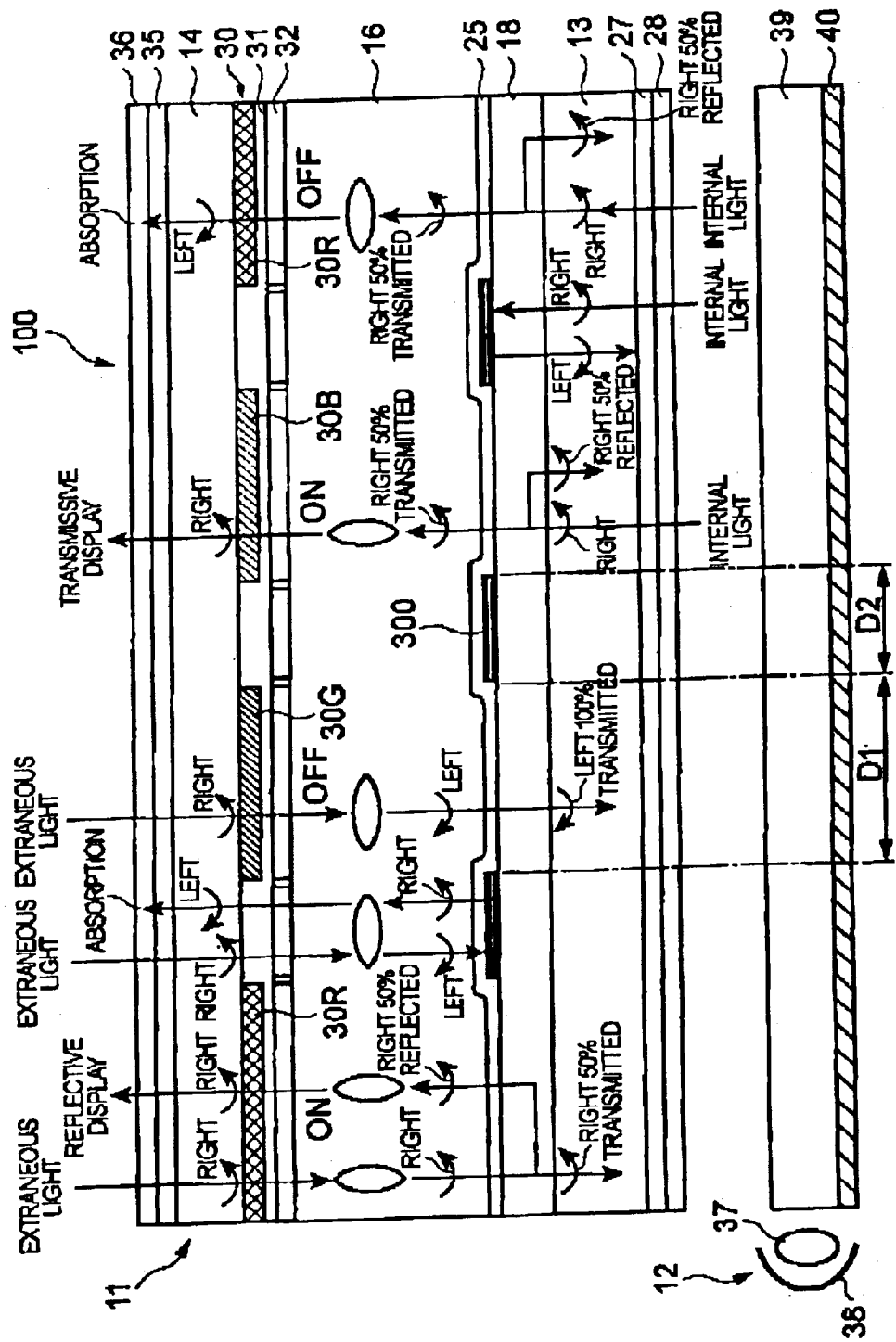
FIG. 2 is a schematic diagram of a partial sectional structure of a liquid crystal display device according to another embodiment.

FIG. 2 is a partial sectional view of an exemplary structure of a liquid crystal display device 100 to which the configuration of the present invention is applied, by taking an active matrix semitransmissive reflective color liquid crystal display device as an example. The same components as those in the liquid crystal display device 10 according to the First Embodiment have the same reference numerals, and a detailed description thereof will be omitted. The liquid crystal display device 100 according to the present embodiment can further include a color filter 30 on the liquid crystal layer 16 side of the upper substrate 14.

The color filter 30 can include R (red), G (green), and B (blue) pigment layers 30R, 30G, and 30B arrayed by turns in a substrate plane direction. One of the pigment layers 30R, 30G, and 30B is arranged in one dot display domain D1. A domain between the adjacent pigment layers 30R, 30G, and 30B (domain where no pigment layer is arranged) corresponds to a BM domain D2. A planarizing film (overcoat) 31 is laminated on the liquid crystal layer 16 side of the color filter 30 so as to planarize steps formed by the pigment layers 30R, 30G, and 30B. Pixel electrodes 32 including a transparent conductive film, such as ITO, are disposed on the planarizing film 31.

Of incoming light, the color filter 30 absorbs light with a specific wavelength. For example, the pigment layer 30R corresponding to R (red) absorbs light with a color whose wavelength is a complementary to the wavelength corresponding to R (red). Likewise, the pigment layer 30G corresponding to G (green) absorbs light with a color whose wavelength is a complementary to the wavelength corresponding to G (green), and the pigment layer 30B corresponding to B (blue) absorbs light with a color wavelength is a complementary to the wavelength corresponding to B (blue). Accordingly, counterclockwise circularly polarized light passed through the pigment layer 30R corresponding to R (red) has a wavelength of about 600 to 650 nm.

Figure 3:
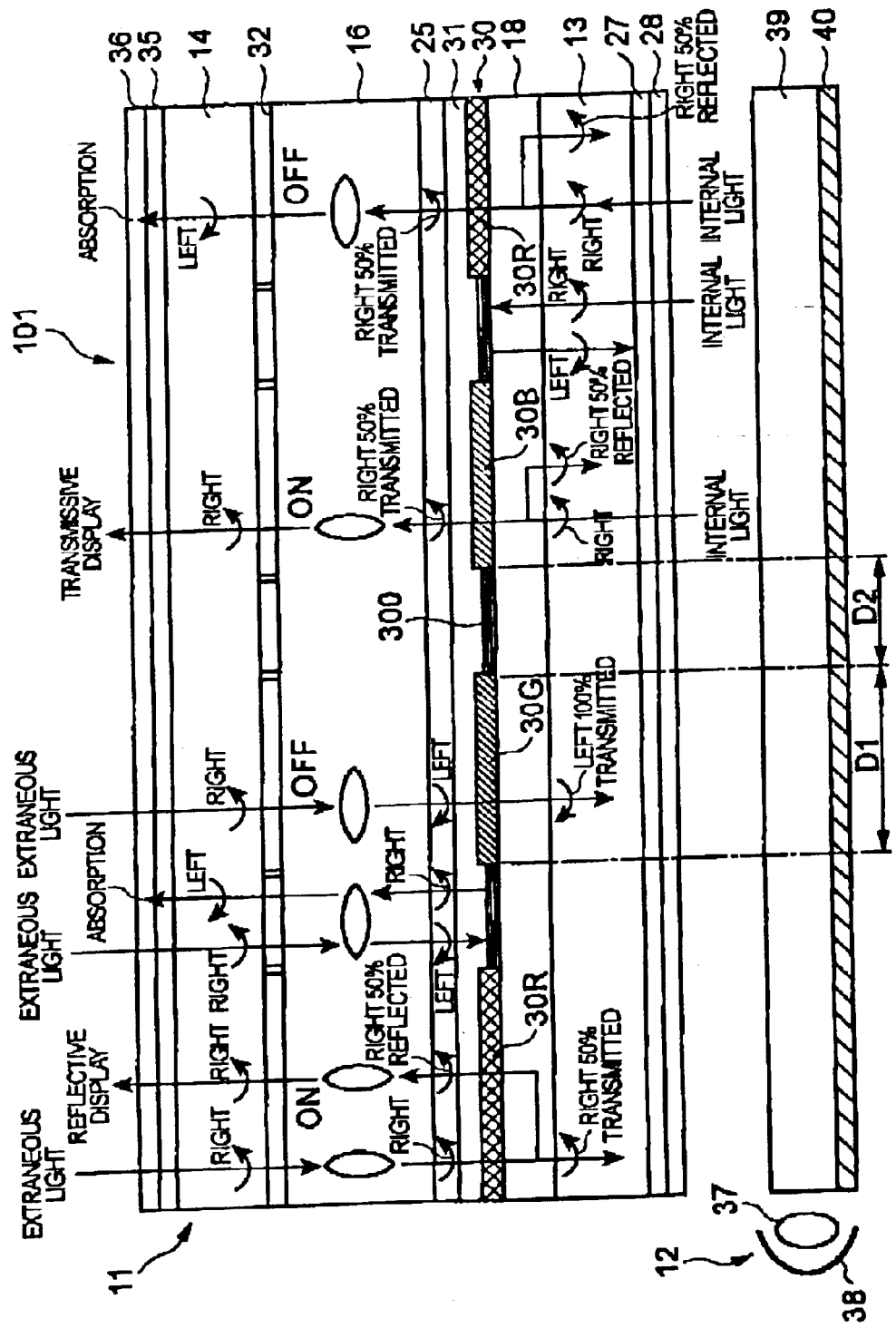
FIG. 3 is a schematic diagram of a partial sectional structure of a liquid crystal display device according to yet another embodiment.

By using the color filter 30 in the liquid crystal display device 100 having the configuration of the present invention, the device can create high-contrast color display. The color filter 30 can be disposed on the liquid crystal layer 16 side of the lower substrate 13, i.e., on the liquid crystal layer 16 side of the semitransmissive reflective layer 18 as shown in FIG. 3.

Figure 4:
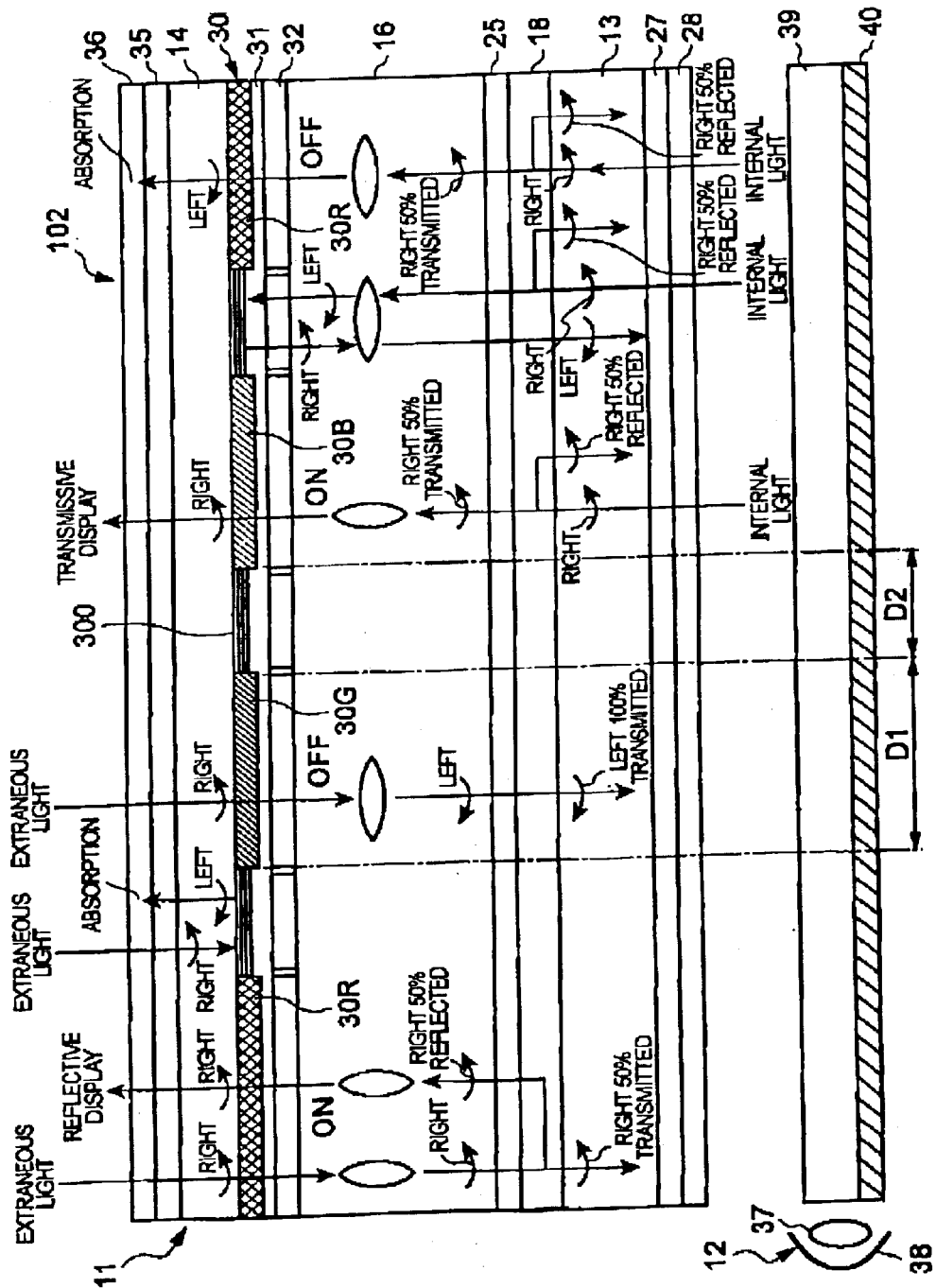
FIG. 4 is a schematic diagram of a partial sectional structure of a liquid crystal display device according to a further embodiment.

The metal reflective layer 300 can be disposed in an interstitial domain (domain where no pigment layer is disposed) in the color filter 30 disposed on the liquid crystal layer 16 side of the upper substrate 14 as shown in FIG. 4. In this case, extraneous light coming through the upper polarizing plate 36 and the wave plate 35 does not pass through the liquid crystal layer 16 in the BM domain D2 and is reflected by the metal reflective layer 300 with a reversed rotational direction, is converted into clockwise circularly polarized light and is absorbed by the upper polarizing plate 36.

Figure 5:
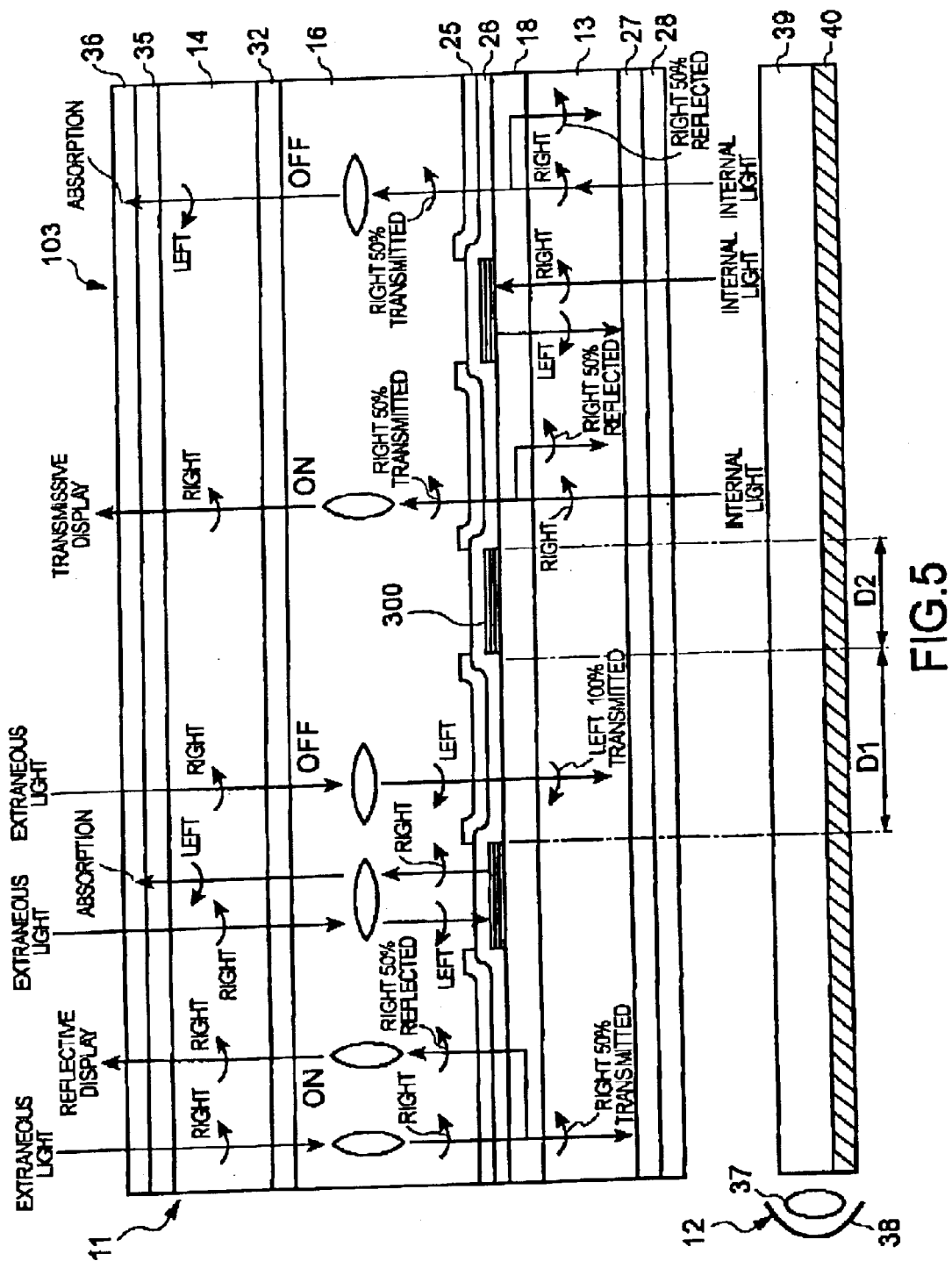
FIG. 5 is a schematic diagram of a partial sectional structure of a liquid crystal display device according to another embodiment.

FIG. 5 is a partial sectional view of an exemplary structure of a liquid crystal display device 103 to which the configuration of the present invention is applied, by taking a passive matrix semitransmissive reflective color liquid crystal display device as an example. The same components as those in the liquid crystal display device 10 according to the First Embodiment have the same reference numerals, and a detailed description thereof will be omitted. The liquid crystal display device 103 according to the present embodiment can further include plural scanning electrodes 25 in a strip form in a plan view on the liquid crystal layer 16 side of the lower substrate 13, i.e., on the liquid crystal layer 16 side of the semitransmissive reflective layer 18 and the metal reflective layer 300. The scanning electrodes 25 are formed as strips, extending in a direction perpendicular to the plane shown in FIG. 5, and ends are formed at intervals in a horizontal direction to the planar view of FIG. 5, corresponding to the dot display domains D1. Plural signal electrodes 32 in a strip form in a plane view are arranged on the liquid crystal layer 16 side of the upper substrate 14. The signal electrodes 32 extend in a horizontal direction with respect to the paper plane of FIG. 5 at intervals in a direction perpendicular to the paper plane of FIG. 5, corresponding to the dot display domains D1. The upper and lower electrodes 32 and 25 are arranged so as to cross each other at right angles in a plane view.

The liquid crystal display device 103 can create both reflective and transmissive displays in the dot display domains D1 and can serve as a black matrix in the BM domain D2 by using the metal reflective layer 300 as in the liquid crystal display device 10 according to the First Embodiment. Accordingly, the device can create high-contrast display as in the First Embodiment. The color filter 30 and the metal reflective layer 300 having a configuration as shown in FIGS. 2 to 4 can also be applied to such a passive matrix semitransmissive reflective liquid crystal display device.

Examples of electronic equipment using the liquid crystal display devices according to the embodiments will be illustrated.

Figure 8:
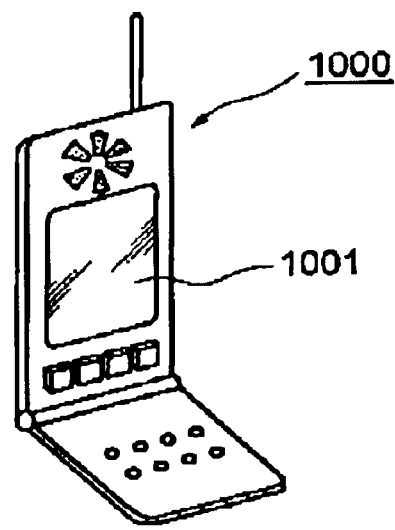
FIG. 8 is a perspective view of an example of electronic equipment according to the present invention.

FIG. 8 is a perspective view of an example of mobile phones. FIG. 8 shows a mobile phone main body 1000 and a liquid crystal display unit 1001 using the liquid crystal display device according to the present invention.

Figure 9:
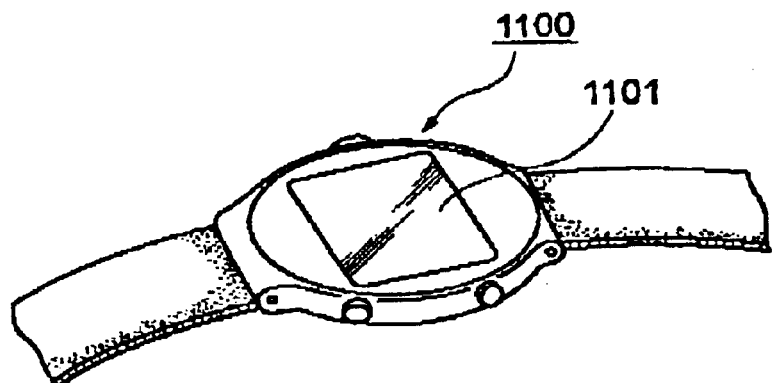
FIG. 9 is a perspective view of another example of electronic equipment according to the present invention.

FIG. 9 is a perspective view of an example of wristwatch-type electronic equipment. FIG. 9 shows a wristwatch main body 1100 and a liquid crystal display unit 1101 using the liquid crystal display device according to the present invention.

Figure 10:
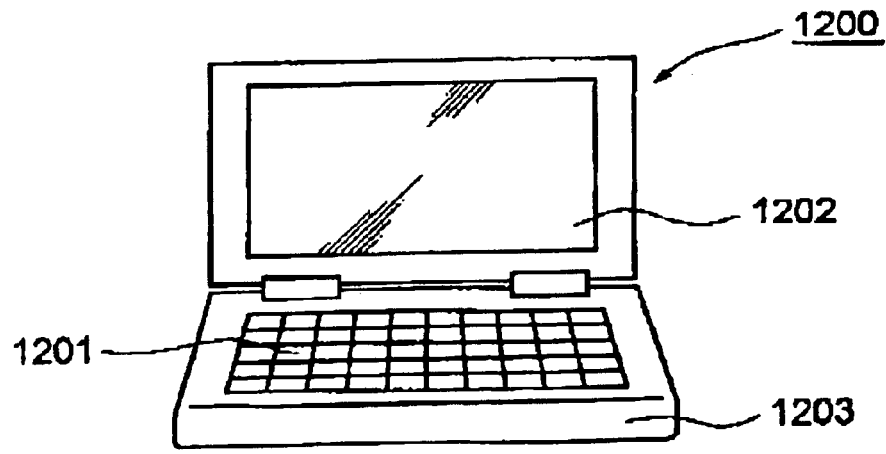
FIG. 10 is a perspective view of yet another example of electronic equipment according to the present invention.

FIG. 10 is a perspective view of an example of mobile information processors such as word processors and personal computers. FIG. 10 shows an information processor 1200, an input unit 1201, such as a key board, an information processor main body 1203, and a liquid crystal unit 1202 using the liquid crystal display device according to the present invention.

The electronic equipment shown in FIGS. 8 to 10 uthe liquid crystal display devices 10, and 100 through 103 and can create high-contrast display.

As is described in detail above, the liquid crystal display devices creating reflective display or semitransmissive reflective display according to the present invention each can include plural dot display domains having a semitransmissive reflective layer capable of allowing circularly polarized light after reflection to have the same rotational direction as that before reflection, and a BM domain (boundary domain) which is a boundary between adjacent dot display domains and has a metal reflective layer that can alter the rotational direction of a reflected circularly polarized light from that before reflection. Reflected light at least having a different rotational direction can be obtained in each domain depending on whether or not a selective electric field is applied to the liquid crystal layer. Either one of the semitransmissive reflective layer or the metal reflective layer can serve as a black matrix. Accordingly, the present invention can provide liquid crystal display devices that can reliably prevent color mixing in display domains and can prevent or suppress decrease in contrast.

What is claimed is:

1. A liquid crystal display device having a liquid crystal cell, the liquid crystal cell including a pair of substrates facing each other and a liquid crystal layer disposed between the pair of substrates, the liquid crystal display device comprising:

a plurality of dot display domains separated by a boundary domain and disposed in a plane;

a specific circularly polarized light introducing device that is capable of introducing circularly polarized light having a predetermined rotational direction between the pair of substrates; and a reflecting device that is capable of at least reflecting circularly polarized light, the reflecting device further comprising a rotational direction controlling device that is capable of controlling the rotational direction of circularly polarized light reflected in the dot display domains so as to differ from that reflected in the boundary domain.

2. The liquid crystal display device according to claim 1, the reflecting device further comprising:

a first reflective layer capable of reflecting at least a part of circularly polarized light having a predetermined rotational direction and capable of allowing the circularly polarized light after reflection to have the same rotation direction as that before reflection; and a second reflective layer at least capable of reflecting circularly polarized light and capable of allowing the circularly polarized light after reflection to have a different rotational direction from that before reflection, wherein the first reflective layer and the second reflective layer are disposed in either of the dot display domains and the boundary domain, respectively.

3. The liquid crystal display device according to claim 2, the first reflective layer being a semitransmissive reflective layer capable of reflecting a part of, and transmitting the other part of the circularly polarized light having a predetermined rotational direction.

4. The liquid crystal display device according to claim 2, the first reflective layer being arranged across the dot display domain and the boundary domain, the second reflective layer being arranged only in the boundary domain;

the first reflective layer being arranged between the liquid crystal layer and one of the pair of substrates and at least serves as the reflecting device in the dot display domain; and the second reflective layer being arranged closer to the other of the pair of substrates than the first reflective layer and serves as the reflecting device in the boundary domain.

5. The liquid crystal display device according to claim 2, the first reflective layer mainly comprising a cholesteric liquid crystal.

6. The liquid crystal display device according to claim 2, the second reflective layer mainly comprising at least one metal film selected from Cr, Ta, Ag, and Al.

7. The liquid crystal display device according to claim 1, further comprising:

a first circularly polarized light introducing device that introduces circularly polarized light through one of the pair of substrates into the liquid crystal layer and serving as the specific circularly polarized light introducing device;

a second circularly polarized light introducing device that introduces circularly polarized light through the other of the pair of substrates and serves as the specific circularly polarized light introducing device, the circularly polarized light having the same rotational direction as the circularly polarized light from the one of the pair of substrates; and a luminaire that irradiates light through the other substrate into the liquid crystal cell, the liquid crystal layer reversing the polarity of incoming circularly polarized light in one of the case with the application of a selective electric field and the case without the application of a selective electric field and does not in the other case.

8. The liquid crystal display device according to claim 1, the specific circularly polarized light introducing device further comprising:

a polarizing plate capable of transmitting linearly polarized light in one direction; and a wave plate capable of converting the linearly polarized light passed through the polarizing plate into circularly polarized light.

9. Electronic equipment comprising the liquid crystal display device as claimed in claim 1.

* * * * *